(12) United States Patent  (10) Patent No.: US 8,793,366 B2
Trebing et al.  (45) Date of Patent: Jul. 29, 2014

(54) METHOD AND ARRANGEMENT FOR DIAGNOSING NETWORKS INCLUDING FIELD BUS SYSTEMS

(75) Inventors: Stefan Trebing, Schwerin (DE); Steffen Himstedt, Schwerin (DE)

(73) Assignee: Trebing & Himstedt Prozessautomation GmbH & Co. KG, Schwerin (DE)

( * ) Notice: Subject to any disclaimer, the term of this patent is extended or adjusted under 35 U.S.C. 154(b) by 903 days.

(21) Appl. No.: 12/591,070

(22) Filed: Nov. 6, 2009

(65) Prior Publication Data

US 2010/0121951 A1 May 13, 2010

(30) Foreign Application Priority Data

Nov. 6, 2008 (DE) .................... 10 2008 056 114

(51) Int. Cl.
*G06F 15/16* (2006.01)
*G06F 15/173* (2006.01)
*G06F 11/00* (2006.01)

(52) U.S. Cl.
USPC .............. 709/224; 709/203; 709/211; 714/30

(58) Field of Classification Search
None
See application file for complete search history.

(56) References Cited

U.S. PATENT DOCUMENTS

| 6,047,222 | A * | 4/2000 | Burns et al. | 700/79 |
| 7,082,340 | B2 * | 7/2006 | Fehrer et al. | 700/83 |
| 7,173,909 | B2 * | 2/2007 | Deuter et al. | 370/242 |
| 2006/0075009 | A1 * | 4/2006 | Lenz et al. | 708/160 |
| 2008/0140874 | A1 * | 6/2008 | Endl et al. | 710/19 |

FOREIGN PATENT DOCUMENTS

| DE | 197 31 026 | 1/1999 |
| DE | 102 52 892 | 6/2004 |

* cited by examiner

*Primary Examiner* — Ranodhi Serrao
*Assistant Examiner* — Farrukh Hussain
(74) *Attorney, Agent, or Firm* — Walter Ottesen P.A.

(57) ABSTRACT

A method for diagnosing networks including networks of field bus systems utilizes an arrangement for diagnosing the networks. The arrangement includes at least two field bus diagnostic apparatuses with each of the field bus diagnostic apparatuses being assigned to a corresponding field bus. The method is carried out with the steps of: causing each of the field bus diagnostic apparatuses to detect current data traffic of the corresponding one of the field busses as a data record and storing the data record on an allocated storage medium; diagnosing the detected data record in an evaluation unit integrated into the corresponding field bus diagnostic apparatus and storing the diagnosed data record in the storage medium allocated to the corresponding field bus diagnostic apparatus; making the detected, diagnosed and stored data record available in the network via a server integrated into each of the field bus diagnostic apparatuses; causing the field bus diagnostic apparatuses to exchange the data records with each other via the servers thereof and the network and storing the exchanged data records on the storage mediums of corresponding ones of the field bus diagnostic apparatuses so that, on each of the storage mediums, the exchanged data records of all other field bus diagnostic apparatuses are stored in addition to the detected, diagnosed and stored data records of the field bus diagnostic apparatus; and, inspecting the detected, diagnosed and stored data records via at least one output unit with each output unit being connected via a client to the network and the data records being made available in the network by at least one arbitrary server.

16 Claims, 8 Drawing Sheets

| Network list for xEPI 2 (x.y.z.92 - AB 000156) | | | | |
|---|---|---|---|---|
| Updated on <Date> at <Time> | | | | |
| Subscriber | | Address | Hostname | Tag |
| △☒ ▢☒ | <Color green> | x.y.z.74 | MonitorDevice_000075 | AB 000075 |
| △☒ ▢☒ | <Color green> | x.y.z.80 | MonitorDevice_00014 | AB 00014 |
| △☒ ▢☒ | <Color red> | x.y.z.92 | MonitorDevice_000156 | AB 000156 |
| △☒ ▢☒ | <Color green> | x.y.z.103 | MonitorDevice_00071 | AB 00071 |
| △☒ ▢☒ | <Color green> | x.y.z.142 | MonitorDevice_000145 | AB 000145 |
| △☒ ▢☒ | <Color green> | x.y.z.154 | MonitorDevice_a5610 | A5610 |
| △☒ ▢☒ | <Color green> | x.y.z.163 | MonitorDevice_000113 | AB 000113 |
| △☒ ▢☒ | <Color green> | x.y.z.164 | MonitorDevice_000102 | AB 000102 |
| △☒ ▢☒ | <Color green> | x.y.z.171 | MonitorDevice_000159 | AB 000159 |
| △☒ ▢☒ | <Color red> | x.y.z.177 | MonitorDevice_00084 | AB 00084 |
| △☒ ▢☒ | <Color yellow> | x.y.z.178 | MonitorDevice_00022 | AB 00022 |
| △☒ ▢☒ | <Color green> | x.y.z.185 | MonitorDevice_000160 | AB 000160 |
| △☒ ▢☒ | <Color green> | x.y.z.173 | MonitorDevice_000159 | AB 000159 |
| | | | | |
| | | | | |

| Network List for xEPI 2 | |
|---|---|
| Detail | Value |
| Location | |
| Number of PROFIBUS Networks | 13 |
| PROFIBUS Networks monitored | 13 |
| PROFIBUS Networks with errors | 3 |
| PROFIBUS Networks with deactivated monitoring | 13 |

Fig. 3

Network List for xEPI 2 (x.y.z.92 - AB 000156)
Updated on <Date> at <Time>

| Subscriber | Address | Tag | Failure | Repeats | Graphic |
|---|---|---|---|---|---|
| △☒ ☐ <Color red> | 2 | S7 | 0 | 32 | <on> |
| △☒ ☐ <Color red> | 14 | SPI3-14 | 1 | 3 | <on> |
| △☒ ☐ <Color red> | 16 | SPI3-16 | 1 | 4 | <on> |
| △☒ ☐ <Color green> | 124 | STAHL IS1 | 4 | 21 | <on> |
| △☒ ☐ <Color green> | 125 | LB/FB | 0 | 4 | <on> |
| Total | - | - | 6 | 32 | <on> |

Graphical Evaluation of Failures and Repeats

Failures/Repeats
32 … 1 3 … 1 4 … 4 21 … 0 4
< 2 >  < 14 >  < 16 >  < 124 >  < 125 >  Subscriber

Allocation Diagnosis Repeater Segment

| Subscriber | Address | Tag | Segment | Error Rate | Reflection Rate |
|---|---|---|---|---|---|
| | | | | | |

Details of PROFBUS Network

| Detail | Value |
|---|---|
| IP Address | x.y.z.92 |
| Designation | 13 |
| Tag | AB 000156 |
| Measurement | running |
| Baud Rate | 187.5 kBit/s |
| PPOFBUS Apparatus | 21 |
| Failed | 3 |
| with Diagnosis | 0 |
| Master | 2 |
| Slaves | 19 |
| Other Apparatus | 0 |
| Failures Master | 0 |
| Repeats Master | 32 |

Fig. 4

| Diagnosis List for xEPI 2 (x.y.z.92 - AB 000156) | | | | | | | |
|---|---|---|---|---|---|---|---|
| Updated on <Date> at <Time> | | | | | | | |
| ID | Date, Time | Subscriber | | Address | Slave ID | Tag | Diagnosis Detail |
| 6 | <Date>, <Time> | △☒ □□ | <Color red> | 124 | 0x049A | STAHL, IS1 | Slave failed |
| 5 | <Date>, <Time> | △☒ □□ | <Color red> | 125 | 0x1711 | LB/FB | Slave is not ready for data exchange |
|  |  | △☒ □□ | <Color red> | 125 | 0x1711 | LB/FB | Slave must be parameterized anew |
| 4 | <Date>, <Time> | △☒ □□ | <Color green> | 124 | 0x049A | STAHL, IS1 | Slave status is OK |
| 3 | <Date>, <Time> | △☒ □□ | <Color red> | 124 | 0x049A | STAHL, IS1 | Slave failed |
| 2 | <Date>, <Time> | △☒ □□ | <Color green> | 124 | 0x049A | STAHL, IS1 | Slave status is OK |
| 1 | <Date>, <Time> | △☒ □□ | <Color red> | 124 | 0x049A | STAHL, IS1 | Slave failed |

Fig. 6

| Live List for xEPI 2 (x.y.z.92 - AB 000156) | | | | |
|---|---|---|---|---|
| Updated on <Date> at <Time> | | | | |
| 0 | 1 | 2 | 3 | 4 |
| 5 □△⊠ | <Color green> 6 | <Color red> 7 | 8 | 9 |
| <Color green> 10 | <Color green> 11 | <Color green> 12 □△⊠ | <Color green> 13 | <Color red> 14 □△⊠ |
| <Color green> 15 | <Color green> 16 | <Color green> 17 □△⊠ | <Color green> 18 | <Color green> 19 □△⊠ |
| 20 □△⊠ | <Color green> 21 | <Color green> 22 □△⊠ | <Color green> 23 | 24 |
| 25 | 26 | 27 | 28 | 29 |
| 105 | 106 | 107 | 108 | 109 |
| <Color green> 110 □△⊠ | <Color green> 111 | 112 | 113 | 114 |
| 115 | 116 | 117 | 118 | 119 |
| <Color green> 120 □△⊠ | 121 | 122 | 123 | <Color red> 124 □△⊠ |
| <Color red> 125 □△⊠ | 126 | | | |

Fig. 7

METHOD AND ARRANGEMENT FOR DIAGNOSING NETWORKS INCLUDING FIELD BUS SYSTEMS

CROSS REFERENCE TO RELATED APPLICATION

This application claims priority of German patent application no. 10 2008 056 114.2, filed Nov. 6, 2008, the entire content of which is incorporated herein by reference.

FIELD OF THE INVENTION

The invention relates to a method for diagnosing networks including field bus systems as well as a corresponding arrangement for applying the method.

BACKGROUND OF THE INVENTION

Diagnostic methods and arrangements of the kind referred to above are used for monitoring networks including field bus systems.

Industrial networks connect different process systems such as field apparatus, controls and visualization. Field apparatus include especially sensors, actuators or drives. Controls are open loop or closed loop controls especially control units, controllers and computers having open loop control programs and closed loop control programs. Visualization includes especially display apparatus and display screens of the computers or mobile devices.

Industrial networks are field bus systems (for example, Profibus or Interbus) and systems, which are based on the ethernet, for example, Profinet. Two networks are coupled to each other or are separated from each other via a router.

Field bus systems include a network, at least one field apparatus as well as network infrastructure components, for example, repeaters and/or couplers. In field bus systems, the field apparatus are, as a rule, referred to as master and slaves. The masters can, without command, access common resources; whereas, the slaves can access these resources only when they are asked by a master.

Several servers and clients communicate with each other via the network. A server is a computer program which offers a service. In contrast, a client is a computer program which, in accordance with the server/client model, establishes a connection to a server via the network and exchanges information therewith. The server is capable, at any time, to react to the contact request of a client. A web browser is a client which establishes contact to a web server and requests a specific web page from this server and makes the web page available to an output unit for display.

A broadcast defines the characteristic in a network. A broadcast is a message wherein data packets are transmitted from one point to all subscribers of a network.

An SNMP (Simple Network Management Protocol) is a network protocol with which the subscribers of a network can be monitored and controlled.

In industrial networks, especially of field bus systems, different errors can occur, for example, invalid signal levels or invalid signal shapes which are caused by defectively operating or incorrectly configured process systems, electromagnetic disturbances or a line interruption. For this reason, industrial networks must be monitored wherefor different diagnostic apparatuses are known.

An arrangement for the diagnosis and/or parameterization of field apparatus integrated into a field system is disclosed in U.S. Pat. No. 7,082,340 and United States patent publication 2004/0098143. With this arrangement, the apparatus parameters of the field apparatus can be read out and/or can be transferred into the field apparatus as well as read out and/or apparatus parameters to be transmitted can be visibly displayed via an output unit.

However, it is a disadvantage that this arrangement is also an active bus subscriber for the diagnosis and therefore intervenes in the field bus which is not wanted by many system operators for diagnostic purposes.

Furthermore, it is disadvantageous that always only one field apparatus can be diagnosed with this arrangement. Several field apparatuses can only be monitored sequentially and therefore not at the same time and not continuously.

A method for diagnosing field apparatuses is known from German patent publication 102 52 892 A1 wherein a software agent is integrated onto a processor of a field apparatus which, with the occurrence of an error, outputs a field error announcement to the guidance system. Here, it is a disadvantage that an announcement as to the state of the field apparatus is only outputted to the guidance system when an error occurs.

In addition, both solutions presented up to now have the disadvantage that a manufacturer-specific evaluation software is needed which limits the application of use of these solutions.

Furthermore, to diagnose field bus systems, it is known to utilize so-called protocol analyzers. Protocol analyzers are, for example, telegram analyzers or bus monitors which comprise primarily interface component groups having a software corresponding thereto and wherewith the data packets (so-called telegrams), which are transmitted in a field bus, are evaluated. These interface component groups are, for example, PC plug-in cards or external adaptors with the external adaptors being connected to a computer via known interfaces, for example, a USB interface.

A computer-implemented diagnostic method for a field bus system and an arrangement corresponding thereto are known, for example, from United States patent publication 2008/0140874 wherein the transmitted data packets are detected, analyzed and stored. For analyzing, the currently detected data packet is compared to the previously stored data packet and the current state of the field bus system is derived. Here, it is, however, a disadvantage that this computer-implemented diagnostic method is an apparatus-specific and/or manufacturer-specific software which, in turn, significantly limits the application of use of these solutions. In addition, each field apparatus mostly has a large number of apparatus parameters whereby, in this solution, also the data quantities, which are transmitted, are very large.

It is also a disadvantage that this computer-implemented diagnostic method and the arrangement corresponding thereto are suitable only for monitoring one field bus system.

Furthermore, a diagnostic arrangement for a field bus system is known from U.S. Pat. No. 7,173,909 which, however, is tied into a higher-order application such as a visualization application. This higher-order application is integrated into a computer having an interface component group (for example, a PC plug-in card) in the form of software. Each diagnostic unit is electrically connected to the computer.

This suggested solution, however, has the disadvantage that the higher-order computer is separately electrically connected to each diagnostic unit and an updating of the diagnostic data of each diagnostic unit takes place sequentially on the computer. In this way, the updating of the diagnostic data of each diagnostic unit is shifted in time on the computer so that an error in a field bus system is not updated and displayed on the computer with its occurrence but is updated and displayed with a delay.

A diagnostic arrangement for a control and data transmitting system in automation technology is disclosed in German patent publication 197 31 026 C2. The diagnostic arrangement is connected via a connecting unit to a field bus system and via an interface to an ethernet. In this way, the respective control and data transmission systems can be connected to a computer via the ethernet. The computer has a network management and the interfaces transmit data between the respective field bus systems and the network management.

This solution, however, has disadvantages. In this solution too, an apparatus-specific software is needed for the network management whereby the readiness of use of this solution is significantly limited. In addition, because of the large data quantities, which are to be exchanged between the interfaces and the computer, the scope of use of this solution is limited by the bandwidth of the ethernet. Furthermore, no simultaneous access to the data by several computers is possible with this central arrangement in the form of the network management so that no decentralized diagnosis and/or diagnosis evaluation can take place. This access to the data is also carried out independently of each other and from different locations.

SUMMARY OF THE INVENTION

It is an object of the invention to provide a method for diagnosing field bus systems as well as an arrangement corresponding thereto which makes possible a continuous status analysis of all field bus systems as well as allows access to diagnostic data with the access being carried out simultaneously, independently from each other and from different locations.

The method of the invention is for diagnosing networks including networks of field bus systems utilizing an arrangement for diagnosing the networks which includes at least two field bus diagnostic apparatuses with each of the field bus diagnostic apparatuses being assigned to a corresponding field bus. The method includes the steps of: causing each of the field bus diagnostic apparatuses to detect current data traffic of the corresponding one of the field busses as a data record and storing the data record on an allocated storage medium; diagnosing the detected data record in an evaluation unit integrated into the corresponding field bus diagnostic apparatus and storing the diagnosed data record in the storage medium allocated to the corresponding field bus diagnostic apparatus; making the detected, diagnosed and stored data record available in the network via a server integrated into each of the field bus diagnostic apparatuses; causing the field bus diagnostic apparatuses to exchange the data records with each other via the servers thereof and the network and storing the exchanged data records on the storage mediums of corresponding ones of the field bus diagnostic apparatuses so that, on each of the storage mediums, the exchanged data records of all other field bus diagnostic apparatuses are stored in addition to the detected, diagnosed and stored data records of the field bus diagnostic apparatus; and, inspecting the detected, diagnosed and stored data records via at least one output unit with each output unit being connected via a client to the network and the data records being made available in the network by at least one arbitrary server.

The new method for diagnosing networks including field bus systems and the arrangement corresponding thereto eliminate the above-mentioned disadvantages of the state of the art.

In the application of the new method for diagnosing networks including field bus systems, it is advantageous that, in a first method step, the detected data record is diagnosed in respective evaluation units integrated into each field bus diagnostic apparatus and is stored as diagnosed data record on the corresponding storage medium. In this way, a continuous status analysis of all field bus systems is realized. Furthermore, the detected data reports are diagnosed locally near the field bus and need not first be transmitted over the network. In this way, the network is relieved and no data loss on the network can occur.

It is also advantageous when, in a second method step, the detected, diagnosed and stored data reports are made available in a network by a server integrated into each field bus diagnostic apparatus and the field bus diagnostic apparatuses exchange their data reports via the servers and the network and the exchanged data reports are stored on the storage mediums of the field bus diagnostic apparatuses so that, on each storage medium, the exchanged data reports of all other field bus diagnostic apparatuses are stored in addition to the detected, diagnosed and stored data reports of the field bus diagnostic apparatus.

When, in a last method step, the data reports of all field bus diagnostic apparatuses are inspected via at least one output unit, then the access via the output units to the diagnostic data is simultaneous as well as independent in time and location from each other. Each output unit is connected via a client to the network. The data reports, which are made available, are detected, diagnosed and stored by any arbitrary server in the network.

It is also advantageous when the storage mediums exchange the data reports, which are stored on the storage mediums, with each other continuously or in accordance with defined time intervals or in response to an external request or exchange the data reports, which are stored on the storage mediums, only with each other when, on any arbitrary storage medium, the current detected data report differs from the last-stored data report corresponding thereto. With the first mentioned exchange variation of the data reports, the continuous data exchange is realized so that the error detection takes place in close time proximity. With the three last-mentioned exchange variations of the data reports, a discontinuous data exchange is realized in each case which leads to a reduction of the exchanged data quantity and therefore to a relief of the network.

It is also advantageous when each data report includes especially the time, bus address of the field apparatus, the number of malfunctions of a field apparatus, the number of error diagrams and the number of repeats. The number of error patterns is the number of violations of the protocol specifications such as the non-maintenance of the check sum and the number of repeats is the number of attempts of a field apparatus to transmit a data packet and to therefor obtain a receipt confirmation from the receiver. Only the above-mentioned basis information is exchanged as data report between the field bus diagnostic apparatuses. Detailed information as to the individual field apparatuses of the particular field busses can be inspected via a specific access to the server of the particular field bus diagnostic apparatus. In this way, the information transmission is manageable and is structured for a user so as to be easily understandable.

It is advantageous in the application of the new arrangement for diagnosing networks including field bus systems that each field bus diagnostic apparatus has an interface for detecting the data of the particular field bus, an evaluation unit for evaluating the detected data of the particular field bus, a storage medium for storing the detected data of the particular field bus and a server for making available the detected and stored data in the network. The server is connected to a network. Furthermore, the field bus diagnostic apparatuses are connected to each other via the network. The field bus diagnostic apparatuses exchange the data via their servers with each other, which data are stored on the storage mediums, and store the exchanged data so that the detected and stored data are stored on all servers continuously and can be called up via at least one output unit having a client connected to the network. This new arrangement thereby permits a continuous status analysis of all field bus systems as well as simultaneous accesses by at least one output unit to the diagnostic data. The accesses are carried out timely and spatially independently of each other.

BRIEF DESCRIPTION OF THE DRAWINGS

The invention will now be described with reference to the drawings wherein:

FIG. 3 is a schematic of a network list of a level 1;

FIG. 4 is a schematic of an error statistic of level 2;

FIG. 6 is a schematic of a diagnosis list of level 2;

FIG. 7 is a schematic of the live list of level 2; and,

DESCRIPTION OF THE PREFERRED EMBODIMENTS OF THE INVENTION

Figure 1:
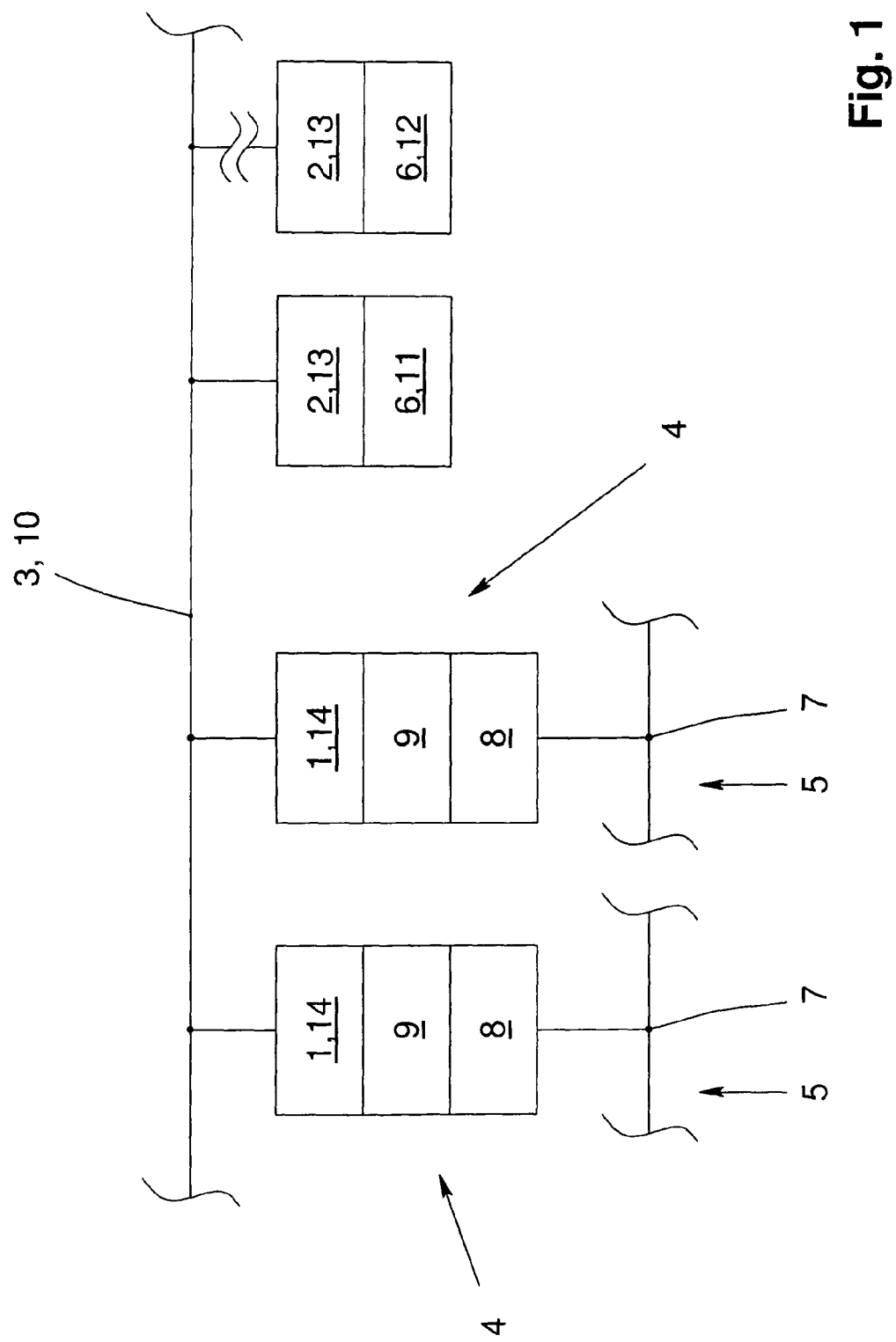
FIG. 1 is a schematic of an arrangement according to a first embodiment of the arrangement of the invention for diagnosing networks.

The new arrangement for diagnosing networks, especially field bus systems, is shown in FIG. 1 and includes at least two servers 1 and at least one client 2 which are connected to each other via a network 3. Each server 1 is integrated in a corresponding one of the field bus diagnostic apparatuses 4 for a corresponding one of the field busses 5 to be monitored. Each client 2 is integrated into a corresponding one of the output units 6.

Furthermore, in addition to the servers 1, the following are provided in each field bus diagnostic apparatus 4: an interface 7 for detecting the data of the field bus 5 to be monitored; an evaluation unit 8 for evaluating the detected data of the corresponding field bus 5; and, a storage medium 9 for storing the detected data of the corresponding field bus 5.

During operation of the arrangement for diagnosing networks, especially field bus systems, the data, which are transmitted on the corresponding ones of the field buses 5, are detected as data records by the field bus diagnostic apparatuses 4. These data are evaluated in the corresponding evaluation unit 8 and stored in the corresponding storage medium 9. The detected data records are expanded by the evaluation results and are stored as data records with evaluation. Furthermore, the servers 1 exchange data with each other via the network 3 and store this exchanged data in their corresponding storage mediums 9 so that the exchanged data are accessible on all servers 1. Access can be had to all servers 1 spatially and timely independently of each other via the client 2 and the network 3. On the corresponding server 1, in addition to the detected and stored data records, including the evaluation, the exchanged data of all servers 1 are accessible.

The servers 1 and clients 2 are connected to a time server (not shown, in FIG. 1) via the network 3 so that all servers 1 of the field bus diagnostic apparatuses 4 and all clients 2 operate at the same clock time.

In a first embodiment of the new arrangement for diagnosing networks, especially, field bus systems according to FIG. 1, the network 3 is an ethernet 10. Furthermore, the output units 6 are a computer 11 and a mobile device 12 having respective web browsers 13 as clients 2 and the servers 1, which are integrated into the field bus diagnostic apparatuses 4, are each a web server 14 with the web browser 13 and the web servers 14 being connected to the ethernet 10. With the connection of the web browser 13 and the web servers 14 to the ethernet 10, all field bus diagnostic apparatuses 4 can be connected to each other and to the computer 11 and the mobile device 12 via the web server 14. Furthermore, each field bus diagnostic apparatus 4 has a corresponding evaluation unit 8 with a corresponding storage medium 9 as well as an interface 7. Each field bus diagnostic apparatus 4 is coupled via its interface 7 to a corresponding field bus 5 to be monitored.

Figure 2:
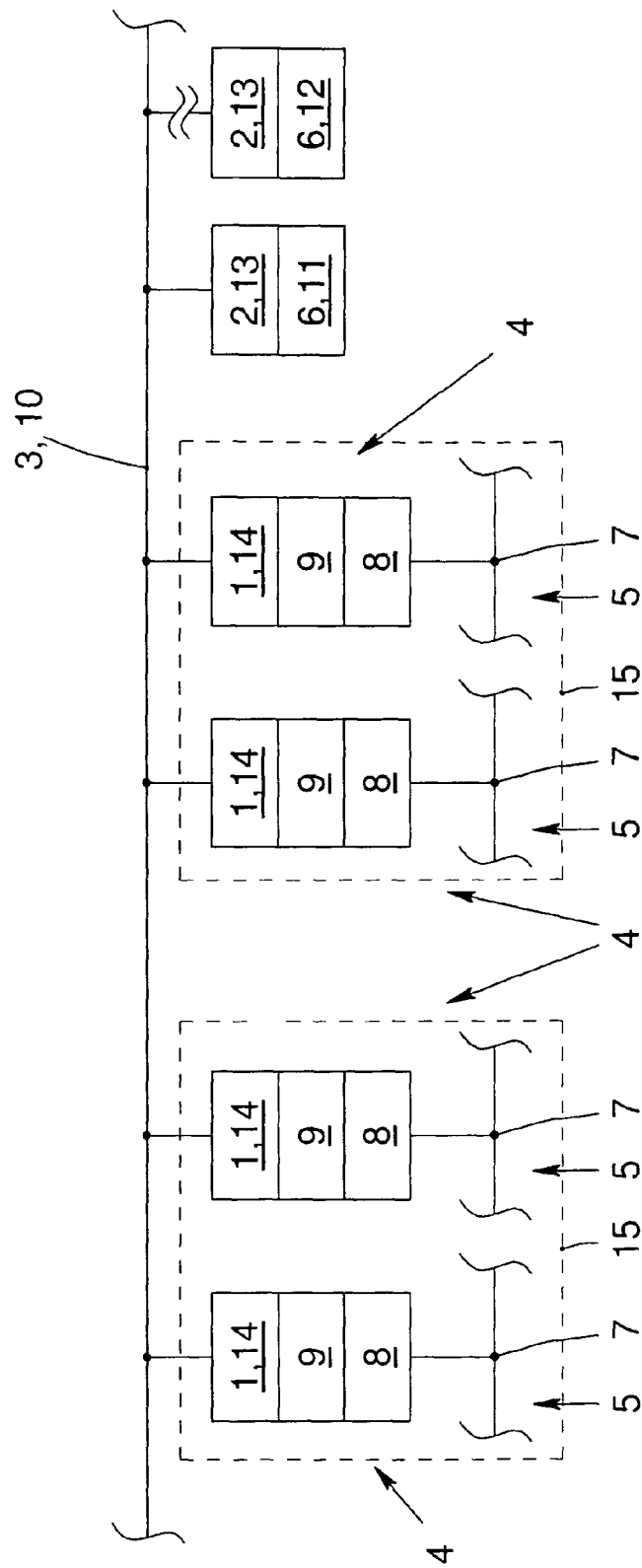
FIG. 2 is a schematic showing a second embodiment of the arrangement of the invention for diagnosing networks.

In a second embodiment according to FIG. 2 of the new arrangement for diagnosing networks, especially field bus systems, at least two field bus diagnostic apparatuses 4 are assigned to at least one system 15. The field bus diagnostic apparatuses 4 are configured as in the first embodiment and can be connected to the computer 11 and the mobile device 12.

Likewise, a web browser 13, which is connected to the ethernet 10, is integrated into each of the computer 11 and the mobile device 12 and a web server 14, which is connected to the ethernet 10, is integrated into the field bus diagnostic apparatuses 4 so that all field bus diagnostic apparatuses 4 of all systems 15 can be connected via the ethernet 10 to each other as well as to the computer 11 and the mobile device 12. Also, each of the field bus diagnostic apparatuses 4 has an evaluation unit 8 with a storage medium 9 as well as an interface 7. In this embodiment, the corresponding field bus diagnostic apparatuses 4 are connected via their interfaces 7 to corresponding ones of the field buses 5, which are to be monitored, of the corresponding system 15.

Alternatively, the field bus diagnostic apparatuses 4 of each system 15 can be coupled or decoupled from each other via a router (not shown in FIG. 2) so that all field bus diagnostic apparatuses 4 of a system 15 are connected in one or several system networks, at one or several spatially distributed locations to the ethernet 10 via the corresponding router.

Each field bus diagnostic apparatus 4 in the two above-mentioned embodiments monitors the data traffic in the particular field bus 5. The data traffic in each field bus 5 is detected in each case as a data record via the interface 7 and is evaluated in the corresponding evaluation unit 8 and is stored together with the evaluation on the storage medium 9 corresponding thereto. These data sets include information as to:

(1) the condition of the field apparatuses and apparatus-specific information such as:
  bus address and field apparatus type;
  field apparatus is in the start phase or warm-up phase, runs in steady state operation, is running down or has malfunctioned;
  field apparatus is or will be incorrectly parameterized or configured;
  field apparatus transmits operating state;
  field apparatus transmits alarm or error message; and,
  field apparatus transmits input data/output data of the field apparatus.

(2) status information which relates to the field bus and its connection to the different process systems (field apparatus, control and visualization) such as:
   connecting state is established or will be established;
   connecting state is taken down or will be taken down;
   connecting characteristics, for example, cyclical, acyclical, logic channel number.
(3) status data which reflect bus-specific parameters such as:
   topology;
   transmitting method, line length and transmitting speed;
   priorities, cycle times and pause times;
   error statistics such as telegram iterations or defective telegrams.

Each field bus diagnostic apparatus 4 thereby monitors the data traffic in the particular field bus 5 wherein the data traffic in the particular field bus 5 is continuously detected and evaluated via the interface 7 and the evaluation unit 8 of the corresponding field bus diagnostic apparatus 4 as an above-described data record as well as being stored on the corresponding storage medium 9 so that on each field bus diagnostic apparatus 4, the corresponding current data record and the previous data records are stored.

At the same time, the field bus diagnostic apparatuses 4 exchange their web addresses by means of broadcast via the web server 14, which is integrated in each field bus diagnostic apparatus 4, and the ethernet 10 so that the web addresses of the web servers 14 of all other field bus diagnostic apparatuses 4 can be called up on each field bus diagnostic apparatus 4.

If now the computer 11 and/or the mobile device 12 is connected via the corresponding web browser 13 and the ethernet 10 to the web server 14 of any desired field bus diagnostic apparatus 4, then, with the computer 11 and/or the mobile device 12, on the one hand, the web servers 14 of all other field bus diagnostic apparatuses 4 can be accessed and, on the other hand, the currently detected, evaluated and stored data records of this field bus diagnostic apparatus 4 can be accessed. In this context, it does not matter whether, in correspondence to the above-mentioned embodiments, the field bus diagnostic apparatus 4 of one or more systems 15 is accessed.

The data exchange of the web addresses or the currently detected data records of the field bus diagnostic apparatuses 4 can take place either continuously, in accordance with defined time segments or in response to an external request or command.

With the continuous data exchange of the field bus diagnostic apparatuses 4, a continuous updating of the detected, evaluated and stored data records takes place on all field bus diagnostic apparatuses 4. Because of the data exchange in accordance with defined time segments (with each time segment being, for example, between 1 second and 60 seconds long), the updating of the detected, evaluated and stored data records takes place on all field bus diagnostic apparatuses 4 discontinuously and in defined time segments. With the data exchange in response to an external request or command (the request is an input command of a user on the computer 11 and/or mobile device 12 or is triggered by a computer program integrated into the evaluation unit 8), the updating of the detected, evaluated and stored data records takes place on all field bus diagnostic apparatuses 4 discontinuously and in any arbitrarily defined time steps.

It is also conceivable that the data exchange takes place only when a currently detected data record differs from the corresponding last stored data record on any desired storage medium 9. In this way, the updating of the detected, evaluated and stored data records takes place on all field bus diagnostic apparatuses 4 likewise discontinuously and in arbitrary time steps.

A web application is installed in each web server 14 with which the web addresses of the other web servers 14 as well as the currently detected data records are made available with these data records being evaluated by the evaluation unit 8 and stored on the storage medium 9. For this purpose, the web application has several hierarchically arranged levels.

In the uppermost level 1 according to FIG. 3, all field bus diagnostic apparatuses 4, which are connected to the network 3, especially ethernet 10, are listed in tabular form in a network list in accordance with their web addresses. Furthermore, the status of all field bus diagnostic apparatuses 4 is displayed with these status displays being graphic illustrations shown by icons having a coloring. Here, the coloring of an icon is in:
   red, when, in that field bus 5, which corresponds to the indicated diagnostic apparatus 4, at that time, the communication to at least one field apparatus of this field bus 5 is not possible;
   yellow, when, in the shown diagnostic apparatus 4, a diagnostic result of at least one deviation of a field apparatus of the field bus 5, which corresponds to the diagnostic apparatus 4, from the particular desired state is present;
   green, when, in the field bus, which corresponds to the displayed diagnostic apparatus 4, no diagnostic result is present at that time; and,
   gray, when the shown diagnostic apparatus 4 is deactivated at that time.

Furthermore, a tabular overview list is arranged on the level 1 wherein:
   the sum of all field bus diagnostic apparatuses 4 is shown which, at the present time, are connected to the network 3, especially the ethernet 10;
   the sum of all field bus diagnostic apparatuses 4 is shown which, at the present time, monitor the field buses 5 corresponding thereto;
   the sum of all field bus diagnostic apparatuses 4 is shown wherein, at the present time, a diagnostic result with at least one deviation of a field apparatus of the field bus 5, which corresponds to the particular diagnostic apparatus, from the particular desired state is present; and,
   the sum of all field bus diagnostic apparatuses 4 is shown wherein, at the present time, the monitoring of the field bus 5, which corresponds to the corresponding field bus diagnostic apparatus 4, is deactivated.

Furthermore, additional information as to all fields, which are shown in the network list and overview list, can be inspected via tool-tip-functions connected to a cursor.

With the confirmation of an arbitrary field of the network list, there results a change from level 1 to a level 2 wherein the status of the field apparatuses are pulled together in tabular form with the field apparatuses belonging to a field bus 5. To this belongs the views of the error statistic, bus statistic, diagnosis list as well as a live list.

The view of the error statistic of FIG. 4 includes, on the one hand, a tabular error statistic and a graphic evaluation in the form of a diagram of malfunctions and iterations. The iterations are the number of attempts of a field apparatus to transmit a data packet and to receive therefor a receipt confirmation of the receiver. The tabular error statistic includes a column with the status indication of the field apparatuses. These status indications are again graphic illustrations via icons having a coloring. The coloring of the icons in level 2 is possible in the colors red, yellow, green and gray. The colorations are:

red, when, at the present time, no communication is possible between diagnostic apparatus 4 and the field apparatus which corresponds to this icon;

yellow, when a deviation of the field apparatus, which corresponds to this icon, is present from the desired state;

green, when, at the present time, no diagnostic result is present for the field apparatus which corresponds to this icon; and, gray, when the field apparatus, which corresponds to this icon, is deactivated at the present time.

In the further columns of the tabular error statistic, the following are listed: the bus address, the tag, the number of malfunctions and the number of iterations for each field apparatus.

On the other hand, in the view of the error statistic, in turn, a tabular overview list is arranged wherein:

the sum of all field apparatuses arranged at the present time in the field bus 5 is shown;

the sum of all field apparatuses malfunctioning at the present time is shown;

the sum of all field apparatuses wherein, at the present time, a diagnosis result is present with a deviation of the field apparatus from the particular desired state;

the number of masters, the number of slaves and the number of other apparatus are listed;

the number of malfunctioning masters is shown; and, the sum of iterations of the master as well as additional information such as IP addresses, designations, tag, status of the measurement and baud rate are shown.

Figure 5:
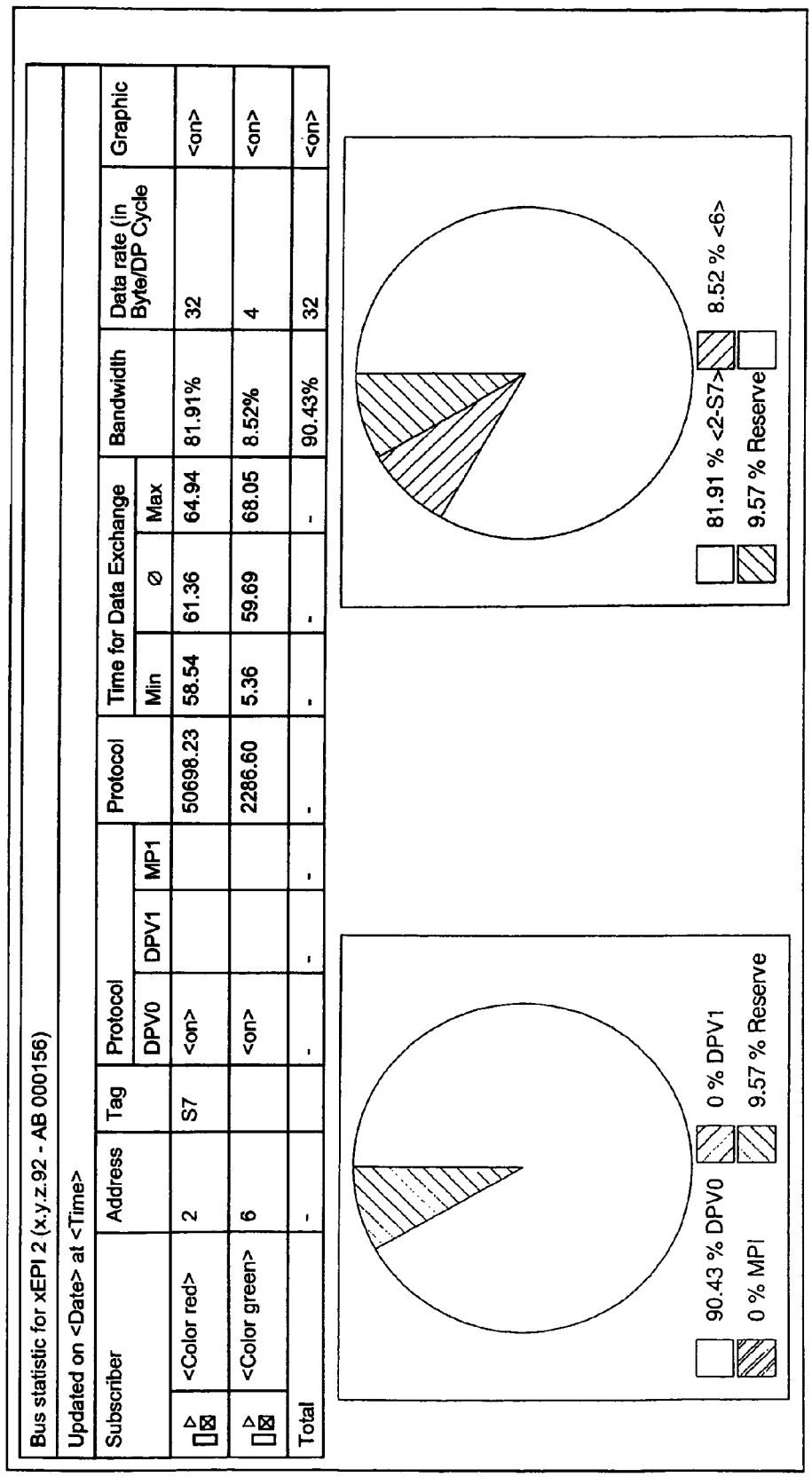
FIG. 5 is a schematic of a view of the bus statistic of level 2.

The view of the bus statistic according to FIG. 5 contains, on the one hand, a tabular listing which in each column lists:

the status indication of the field apparatus with the graphical illustration via icons and the coloration;

address, tag and nature of protocol;

date, control time;

data exchange time as well as bandwidth and data rate.

Further, the following are shown graphically in form of a circular diagram: the protocol distribution and the bandwidth distribution.

On the other hand, in the view of the bus statistic, again a tabular overview list is provided which is identical to the overview list of the view of the error statistic.

In the view of the diagnosis list of FIG. 6, the following, on the one hand, are set forth in a tabular diagnostic list in respective columns:

the status indication of the field apparatuses with the graphic representation via icons and the coloration;

the ID number, address, date and time as well as the slave ID and the diagnosis detail.

The diagnosis detail is a verbal interpretation of the status of the field apparatuses. Verbal interpretations of this kind are, for example:

slave failed;

slave is not ready for the data exchange;

slave must be parameterized anew; or, slave status is OK.

On the other hand, a tabular overview list is likewise arranged in the view of the diagnosis list. The overview list is identical to the tabular overview lists of the view of the error statistic and the view of the bus statistic.

In the view of the live list according to FIG. 7, on the one hand, the particular status of the field apparatus are summarized in sequenced form with the field apparatus belonging to the field bus 5. The status indications are each, in turn, graphical representations via icons having a coloration. On the other hand, in the view of the live list, a tabular overview list is likewise arranged which is identical to the tabular overview lists of the views of the error statistic, bus statistic and diagnosis list.

In all views of the level 2, further information with respect to all fields can be inspected via tool tips which are activated with the cursor.

At this point, it is noted that the web addresses, host names and date listings, which are used in FIGS. 3 to 7, are fictional data and are replaced by real data during a real use of the web application.

In an embodiment of the new arrangement for diagnosing networks, especially field bus systems, at least one interpreter is implemented in the evaluation unit 8 for recognizing apparatus-specific error codes. The interpreter reads a text file, which is supplied by the manufacturer of the field apparatus connected to the field buses 5, and the verbal interpretation of the error code is displayed in the view of the diagnosis list according to FIG. 6.

In this way, with the occurrence of an error code, the currently detected and stored data records are expanded by the interpretation of this error code in the view of the diagnosis list. The interpretation can be a verbal indication such as: "telegram error rate critical", "interruption of the signal line", "short circuit toward display" or "resistance too high".

In a further configuration of the new arrangement for diagnosing networks, especially field bus systems, a software agent is installed in each evaluation unit 8 of the field bus diagnostic apparatuses 4. Each software agent transmits an error announcement automatically with the occurrence of an error in the corresponding field bus 5 with the transmission taking place, for example, via e-mail, SMS or SNMP, via its web server 14, the ethernet 10 and the web browser 13 to the computer 11 and/or the mobile device 12.

Figure 8:
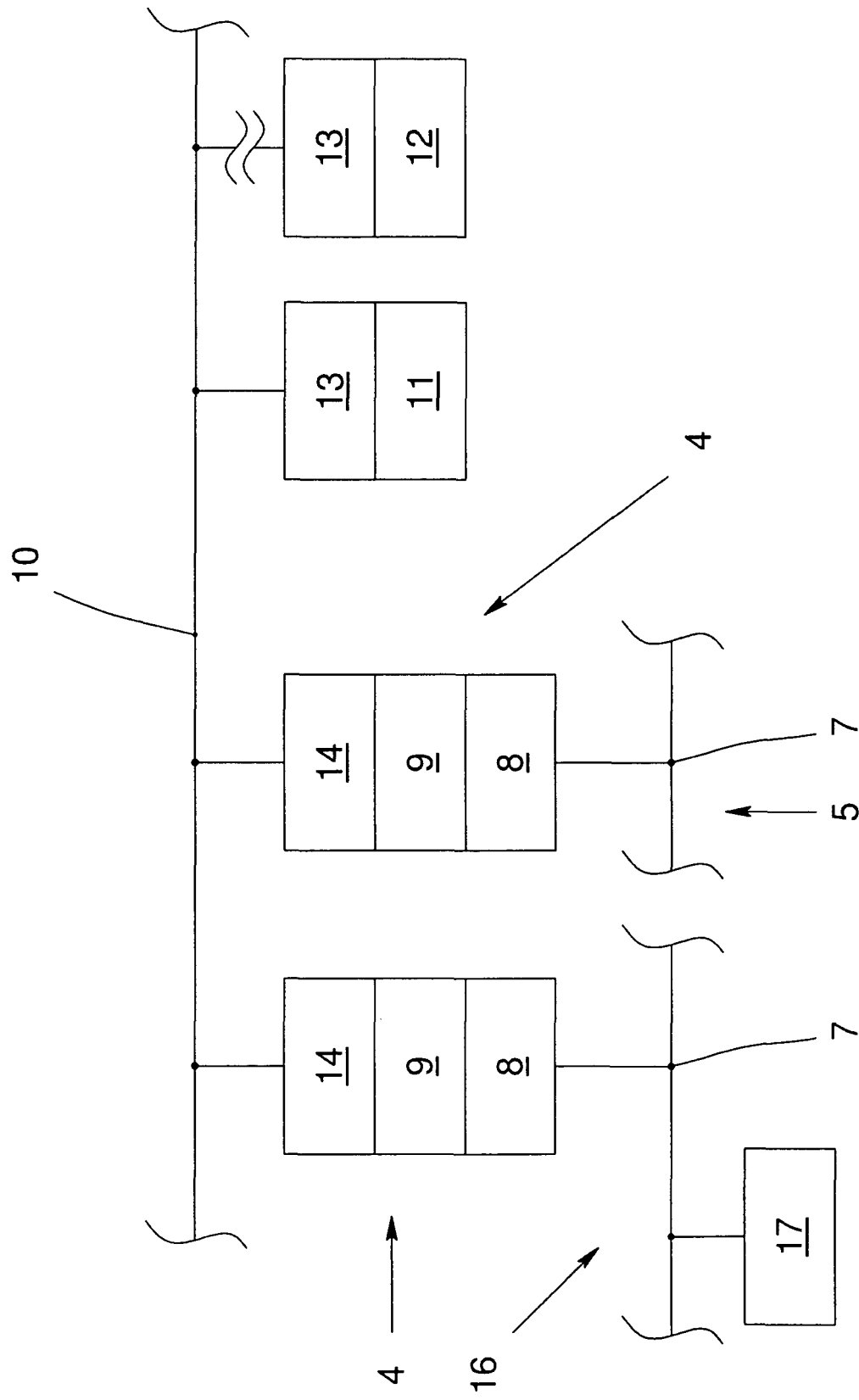
FIG. 8 is a schematic showing the arrangement of the first embodiment when there is an occurrence of a fault.

The operation of the new arrangement for diagnosing networks, especially field bus systems, will now be explained by way of example with respect to the first embodiment. For this purpose, it is assumed that, according to FIG. 8, an error is present because of corrosion on contacts in the field apparatus 17 arranged in the field bus 16 which leads to a slow deterioration of the data traffic on this field bus 5. First, only individual defective data records are detected and stored by the field bus diagnostic apparatus 4. Furthermore, the field bus diagnostic apparatuses 4 continuously exchange their web addresses via their corresponding web servers 14 and the ethernet 10 so that the web addresses of the web servers 14 of all other field bus diagnostic apparatuses 4 can be called up continuously updated on each field bus diagnostic apparatus 4.

If the computer 11 and/or the mobile device 12 are now connected via its web browser 13 and the ethernet 10 to the web server 14 of any arbitrary field bus diagnostic apparatus 4, then the computer 11 and/or the mobile device 12 has access via the web addresses to all field bus diagnostic apparatuses 4. The data records of the field bus diagnostic apparatus 4, which are currently detected and evaluated by the evaluation unit 8 and stored, as well as the stored data records of the other field bus diagnostic apparatuses (via the linked web addresses) are displayed in level 1 on the computer 11 and/or mobile device 12.

In level 1, and according to FIG. 3, all field bus diagnostic apparatuses 4, which are connected to the ethernet 10, are displayed in accordance with their web addresses and the status of all field bus diagnostic apparatuses 4 is listed. The error in the field bus 16 is because of corrosion of contacts of the field apparatus 17. For this reason, the icon of the field bus diagnostic apparatus 4 with the web address x.y.z.92 is colored in red. The red coloring first shows only that a fault has occurred in the field apparatus 17 corresponding to the displayed field bus diagnostic apparatus 4.

By clicking on this red colored icon, a change of the arbitrary field bus diagnostic apparatus 4 takes place from level 1 of this defective field bus diagnostic apparatus 4 to the level 2.

In this level 2 of the defective field bus diagnostic apparatus 4 having the web address x.y.z.92, the status of the field apparatuses, which correspond to the field bus 16, is summarized in tabular form with respect to views of the error statistic, bus statistic, diagnosis list and the live list.

If the view of the live list of FIG. 7 is called up, then the particular status of the field apparatuses, which belong to the field bus 16, is summarized in sequence form by icons having a coloring. The icon of the field apparatus 17 having the address 124 is colored in red.

Because of a change into the view of the error statistic according to FIG. 4 wherein the tabular error statistic and the graphic evaluation are shown, inspection is undertaken into the number of failures and repeats of the field apparatus 17 having the bus address 124. The field apparatus 17 had up to now 4 malfunctions and 21 repeats.

The influence of the defective field apparatus 17 on the bandwidth of the field bus 16 can be recognized with a change into the view of the bus statistic according to FIG. 5.

With a change into the diagnosis list according to FIG. 6, diagnosis details of the defective field apparatus 17 can be recognized by the verbal interpretation of the status of the field apparatus 17. The status of the field apparatus 17 having the bus address 124 changed in the time history continuously between "slave failed" and "slave status is OK".

Finally, with this verbal interpretation of the status of the field apparatus 17 having the bus address 124 as well as the number of failures and the number of needed repeats, the necessary measures can be initiated such as the repair of the field apparatus.

It is possible that the web application in the web servers 14 is realized in several languages so that the language used in the levels corresponds to the language of the country of the user of the computer 11 and/or mobile device 12. The selection of the language in the levels is accommodated either to ethernet addresses of the web browser 13 of the computer 11 and/or mobile device 12 or can be adjusted by a user via an additional selection switch in level 1.

It is also conceivable to install an evaluation software on the computer 11 and/or on the mobile device 12 with which either a central processing and storage of the diagnostic data of the field bus diagnostic apparatuses takes place or expanded diagnoses and prognoses are established from the data records of the field bus diagnostic apparatus 4 and conclusions can be drawn therefrom as to the state of the individual field busses 5.

For the first alternative, the evaluation software could be an application or computer program in the program language "Net or Java" which automatically interrogates the detected data records of the field bus diagnostic apparatuses, evaluates and stores. If an error code is detected in the evaluation, then an alarm is displayed or a user is informed by e-mail, SMS or SNMP.

In the second alternative, a desired-actual comparison of the individual data records of all field bus diagnostic apparatuses 4 is carried out. A theoretical data record is determined from the stored data records in each case which is compared to the currently detected data records. For determining the theoretical data records, mathematical-statistical methods are utilized such as error computation or even artificial neural networks. If the difference between the currently detected data record and the theoretical data record exceeds a limit value, then a corresponding alarm is triggered on the computer 11 and/or the mobile device 12 wherein an alarm is displayed or a user is informed via e-mail, SMS or SNMP.

It is also conceivable that the field bus diagnostic apparatuses 4 not only exchange their web addresses but also their respective currently detected data records via the web server 13 and the ethernet 10 with the web server 13 being integrated into each field bus diagnostic apparatus 4, so that the currently detected, evaluated and stored data records of all field bus diagnostic apparatuses 4 are stored on each field bus diagnostic apparatus 4.

It is also conceivable that the field bus diagnostic apparatuses 4 exchange with each other the data records, which are stored on the storage mediums 9, in response to an external request. The external request takes place from the evaluation unit 8 and the request is triggered manually by a user of the evaluation unit 8 or by a program integrated into the evaluation unit 8.

Alternatively, the computer 11 and/or the mobile device 12 can be connected via the particular web browsers 13 and the ethernet 10 simultaneously to all web servers 14 of the field bus diagnostic apparatuses 4 in that in each web browser 13 for each field bus diagnostic apparatus 4, a browser window is opened. Then, the computer 11 and/or the mobile device 12 has access to all field bus diagnostic apparatuses 4 via the particular browser windows. On the computer 11 and/or mobile device 12, all currently detected and stored data records of all field bus diagnostic apparatuses 4 are displayed each in the level 1 or exclusively in the level 2. The stored data records are evaluated in the particular evaluation unit 8.

It is conceivable also that the network 3 is a radio network such as wireless, UMTS or bluetooth. The particular server 1 and client 2 are equipped with the radio technology corresponding to the network type of the radio network.

It is understood that the foregoing description is that of the preferred embodiments of the invention and that various changes and modifications may be made thereto without departing from the spirit and scope of the invention as defined in the appended claims.

LIST OF REFERENCE NUMERALS

1 Server
2 Client
3 Network
4 Field bus diagnostic apparatus
5 Field bus
6 Output unit
7 Interface
8 Evaluation unit
9 Storage medium
10 Ethernet
11 Computer
12 Mobile device
13 Web browser
14 Web server
15 System
16 Field bus with errors
17 Field apparatus with errors

What is claimed is:

1. A method for diagnosing networks including networks of field bus systems utilizing an arrangement for diagnosing said networks which includes at least two field bus diagnostic apparatuses with each of said field bus diagnostic apparatuses being assigned to a corresponding field bus, the method comprising the steps of:

causing each of said field bus diagnostic apparatuses to detect current data traffic of the corresponding one of said field busses as a data record and storing said data record on an allocated storage medium;

diagnosing the detected data record in an evaluation unit integrated into the corresponding field bus diagnostic apparatus and storing the diagnosed data record in the storage medium allocated to the corresponding field bus diagnostic apparatus;

making the detected, diagnosed and stored data record available across said networks via a server integrated into each of said field bus diagnostic apparatuses;

causing said field bus diagnostic apparatuses to exchange said data records with each other via the server integrated into each of said field bus diagnostic apparatuses and across said networks and storing the exchanged data records on the storage mediums of corresponding ones of said field bus diagnostic apparatuses so that, on each of said storage mediums, the exchanged data records of all other field bus diagnostic apparatuses are stored in addition to said detected, diagnosed and stored data records of the field bus diagnostic apparatus; and, inspecting the detected, diagnosed and stored data records via at least one output unit with each output unit being connected via a client to a network of said networks and said data records being made available in said network by at least one arbitrary server.

2. The method of claim 1, wherein:
said field bus diagnostic apparatuses continuously exchange with each other the data records stored on said storage mediums or in accordance with defined time intervals or in response to an external request; or,
the data records, which are stored on said storage mediums, are only then exchanged with each other when, on any one of said storage mediums, a currently detected data record differs from the last data record corresponding thereto.

3. The method of claim 2, wherein the external request takes place by the evaluation unit with the request being triggered by an operator of the evaluation unit or by a computer program integrated into the evaluation unit.

4. The method of claim 1, wherein the data records, which are stored on the storage mediums, are exchanged via an ethernet; and, for this purpose, the storage medium and a web server are integrated into each field bus diagnostic apparatus so that the field bus diagnostic apparatuses are connected by their respective web servers via said ethernet.

5. The method of claim 4, wherein the detected and stored data records of all storage mediums can be displayed and can be evaluated on a computer, a mobile device or a computer and a mobile device each having a web browser; and, for this purpose, the storage mediums are connected to the web browser of the computer, the mobile device or the computer and the mobile device via the ethernet by the respective web servers.

6. The method of claim 4, wherein the detected and stored data records of all storage mediums can be displayed and evaluated on a computer, a mobile device or a computer and a mobile device each having a web browser; and, for this purpose, the storage medium is connected via the ethernet to the web browser of the computer, the mobile device or the computer and the mobile device by the corresponding web server of any field bus diagnostic apparatus.

7. The method of claim 5, wherein diagnoses are established from the data records of all storage mediums in the evaluation unit integrated into each field bus diagnostic apparatus with said diagnoses making it possible to draw conclusions as to the state of the individual field busses.

8. The method of claim 7, wherein the diagnoses, which are established in the corresponding ones of the evaluation units, are made available in the ethernet via the corresponding web servers; and, said diagnoses include:
(a) a level 1 having a network list wherein all field bus diagnostic apparatuses are listed in accordance with their web addresses with said field bus diagnostic apparatuses being connected to the ethernet, and this status of all field bus diagnosis apparatuses is displayed with these status displays being each graphical displays via icons and coloration; and,
(b) a level 2 with views of an error statistic, bus statistic, diagnosis list and live list wherein:
the error statistic provides information as to the number of failures of a field apparatus and the number of repeats of data packets;
the bus statistic provides information as to the data exchange time, bandwidth and data rate;
the diagnosis list provides information as to a verbal interpretation of the status of the field apparatus via diagnostic details; and,
the live list provides information as to the particular status of all field apparatuses belonging to a field bus.

9. The method of claim 8, wherein at least one interpreter is implemented in each evaluation unit of the field bus diagnostic apparatuses for detecting apparatus-specific error codes from field apparatuses connected to the field busses.

10. The method of claim 7, wherein, in each evaluation unit at least one of the following is performed:
a desired-actual comparison of the detected data records is carried out compared to the stored data records of the corresponding ones of the storage mediums;
a theoretical data record is determined from the stored data records in each case which is compared to the currently-determined data records; or,
the detected data records are automatically evaluated in such a manner that an alarm is displayed or a user is informed via e-mail, SMS or SNMP when an error code is detected.

11. The method of claim 1, wherein each data record includes: time, bus address, number of failures of a field apparatus, number of error diagrams; and, number of repeats; and,
wherein the number of repeats corresponds to the number of attempts of a field apparatus to send a data packet and to receive therefor a receipt confirmation of the receiver; and, the number of error diagrams corresponds to the number of violations of the protocol specifications.

12. The method of claim 1, wherein each field bus diagnostic apparatus is assigned to at least one system having at least one field bus.

13. An arrangement for diagnosing networks including networks of field bus systems having two field busses, the arrangement comprising:
at least two field bus diagnostic apparatuses;
each of said field bus diagnostic apparatuses having an interface for detecting data on a corresponding one of said field busses;
each of said field bus diagnostic apparatuses further including: an evaluation unit for evaluating the detected data of the corresponding one of said field busses; a storage medium for storing the detected data of said corresponding one of said field busses; and, a server connected to said networks;

an output unit having a client connected to a network of said networks; and, said field bus diagnostic apparatuses being connected to each other via said networks to exchange said detected data with each other across said networks and to store the same so that the detected and exchanged data of all of the storage mediums are continuously stored on each of the storage mediums so as to permit said exchanged and stored data to be called up via said output unit, wherein each field bus is connected to a field apparatus independently selected from the group consisting of a sensor, an actuator and a drive;

wherein the data traffic of each one of said field busses is detected by corresponding ones of said field bus diagnostic apparatuses as a data record and is diagnosed in the evaluation unit and is stored as a diagnosed data record on the storage medium corresponding to said one field bus diagnostic apparatus:

wherein said network is an ethernet and the server of each one of said field bus diagnostic apparatuses is a web server integrated therein so that said field bus diagnostic apparatuses are connected to each other by the respective web servers corresponding thereto via said ethernet and with corresponding ones of the output units; and, wherein at least one of the output units and the client corresponding thereto conjointly define at least one of the following: a computer having a web browser and a mobile device having a web browser.

14. The arrangement of claim 13, wherein each of said web servers has a web application with which the diagnosis, which is established in the evaluation unit corresponding thereto, is made available in said ethernet; and, said web application is subdivided into several levels.

15. The arrangement of claim 14, wherein a level 1 of said levels includes a network list wherein all of said field bus diagnostic apparatuses, which are connected to said ethernet, are listed in accordance with their respective web addresses; and, wherein:

a status 1 is present when, in the one field bus corresponding to the displayed field bus diagnostic apparatus, no communication to at least one field apparatus of said one field bus is possible at the time;

a status 2 is present when, in the displayed field bus diagnostic apparatus, a diagnosis result having at least one deviation of a field apparatus of the field bus, which corresponds to said field bus diagnostic apparatus, from the particular desired state is present;

a status 3 is present when, in the one field bus, which corresponds to the displayed field bus diagnostic apparatus, no diagnostic result is present at the time; and, a status 4 is present when the displayed field bus diagnostic apparatus is deactivated at the time.

16. The arrangement of claim 15, wherein a level 2 view shows: an error statistic, a bus statistic, a diagnosis list and a live list wherein:

the error statistic provides information as to the number of failures of a field apparatus and the number of repeats of data packets;

the bus statistic provides information as to a data exchange time, bandwidth and data rate;

the diagnosis list provides information as to the diagnosis detail via a verbal interpretation of the status of the field apparatus; and, the live list provides information as to the respective statuses of all field apparatuses corresponding to the field bus.

* * * * *